Feb. 17, 1931.　　　　G. F. C. BAUER　　　　1,793,042

RECORDING APPARATUS

Original Filed June 22, 1928　　8 Sheets-Sheet 1

Feb. 17, 1931.   G. F. C. BAUER   1,793,042
RECORDING APPARATUS
Original Filed June 22, 1928   8 Sheets-Sheet 3

Inventor
Gustav F. C. Bauer
by Pepper Powers
Attorneys

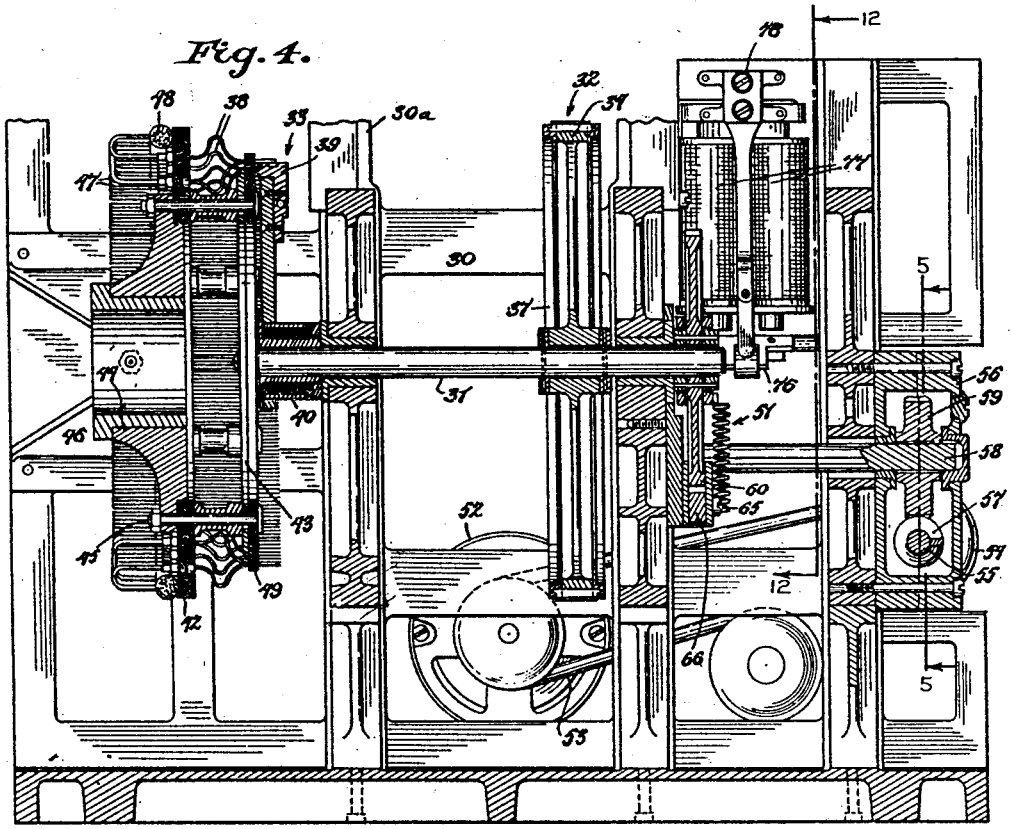
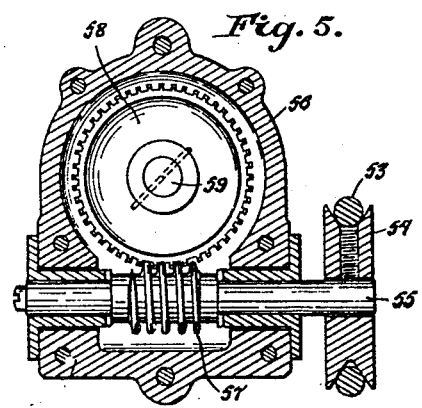
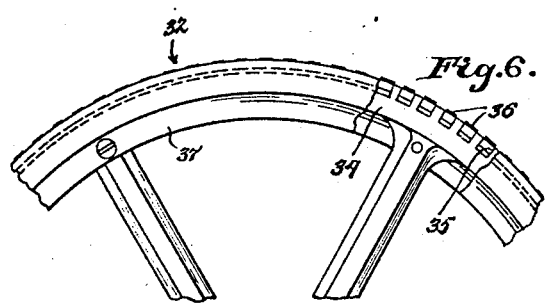

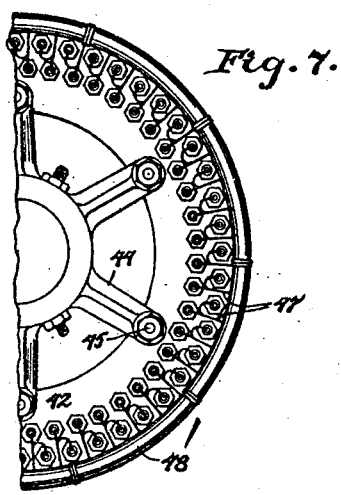
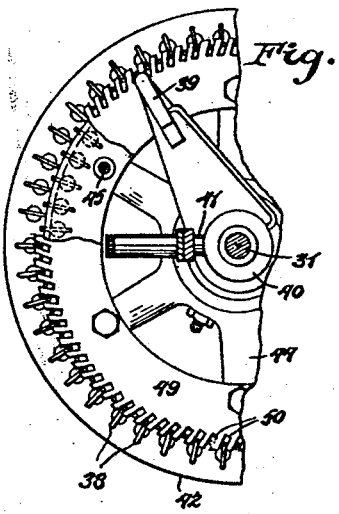
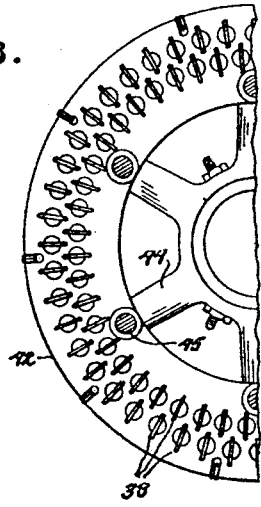
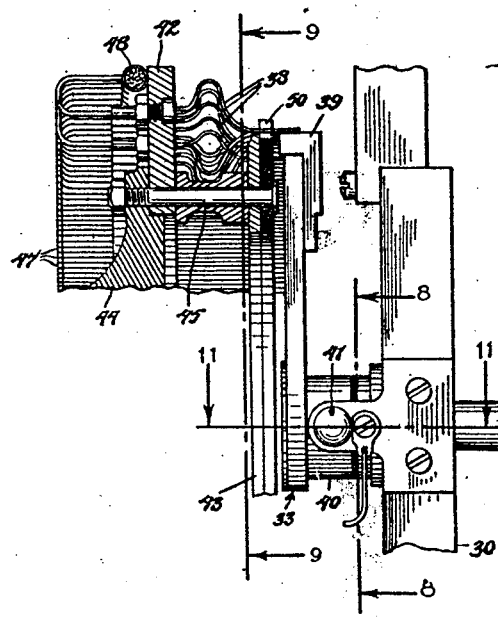
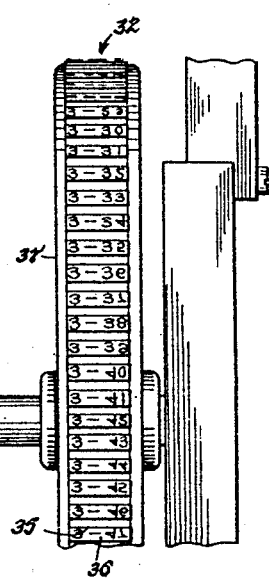
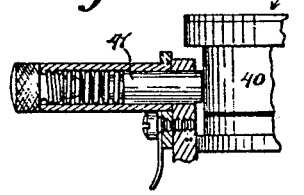

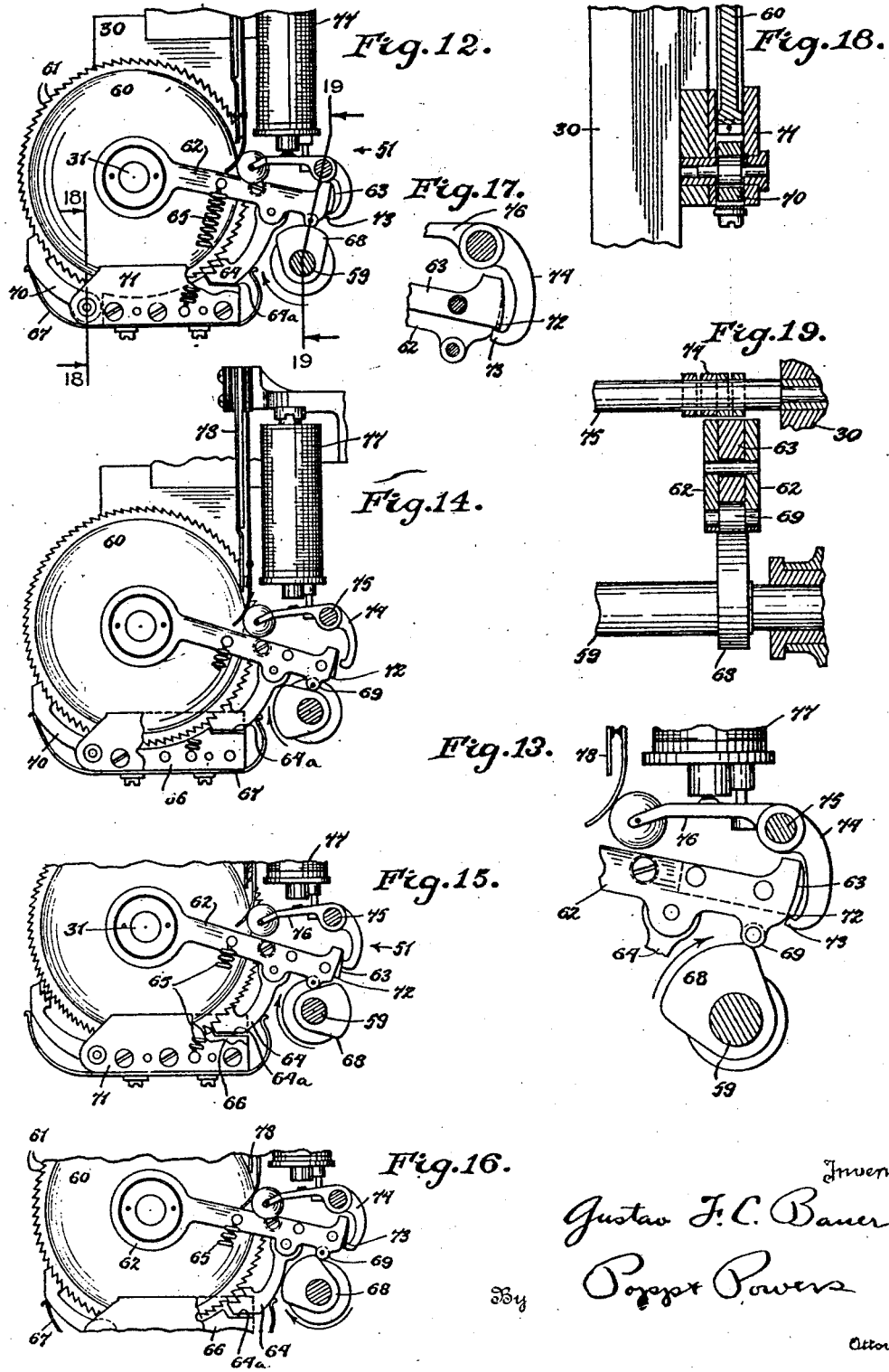

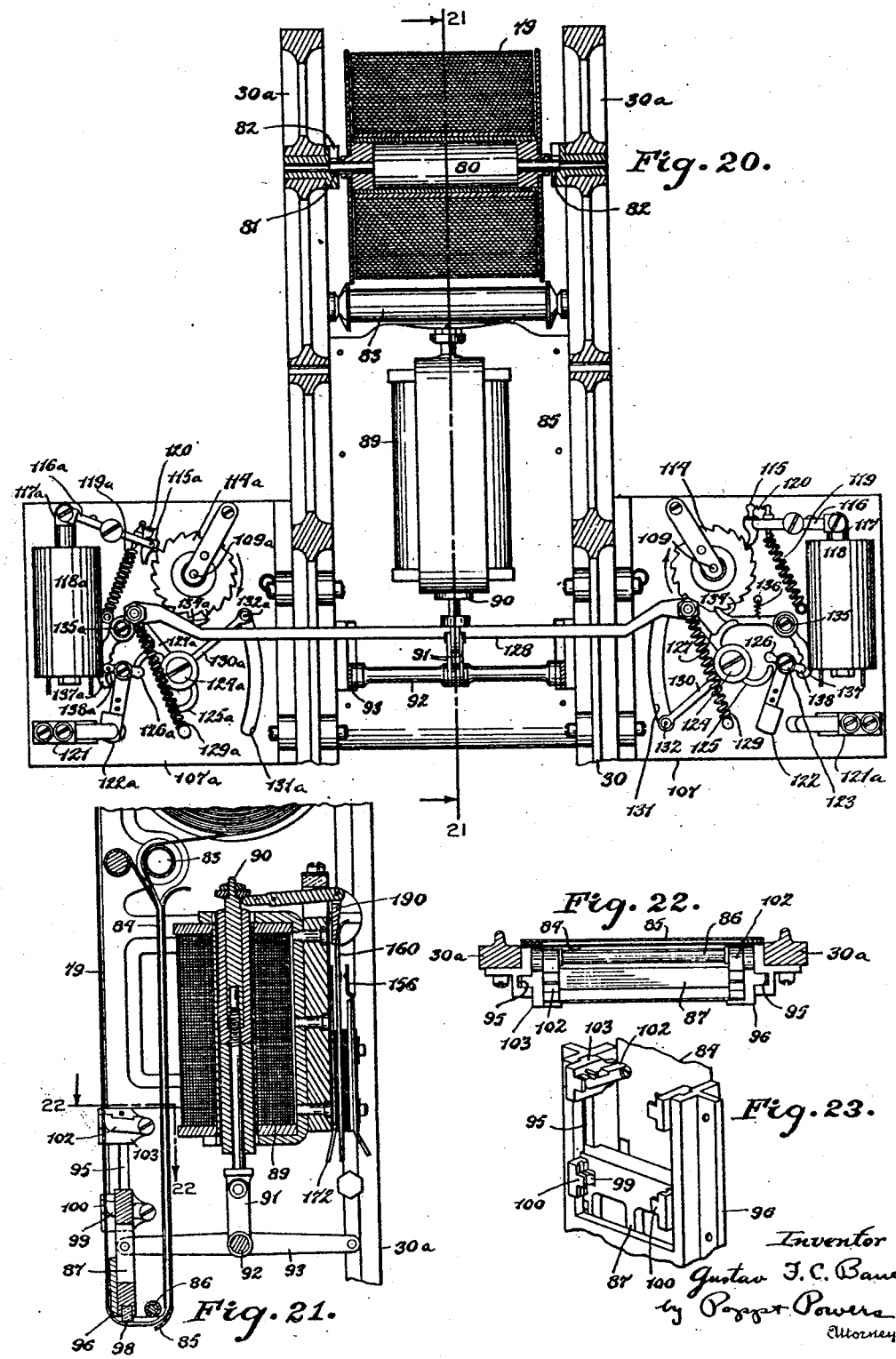

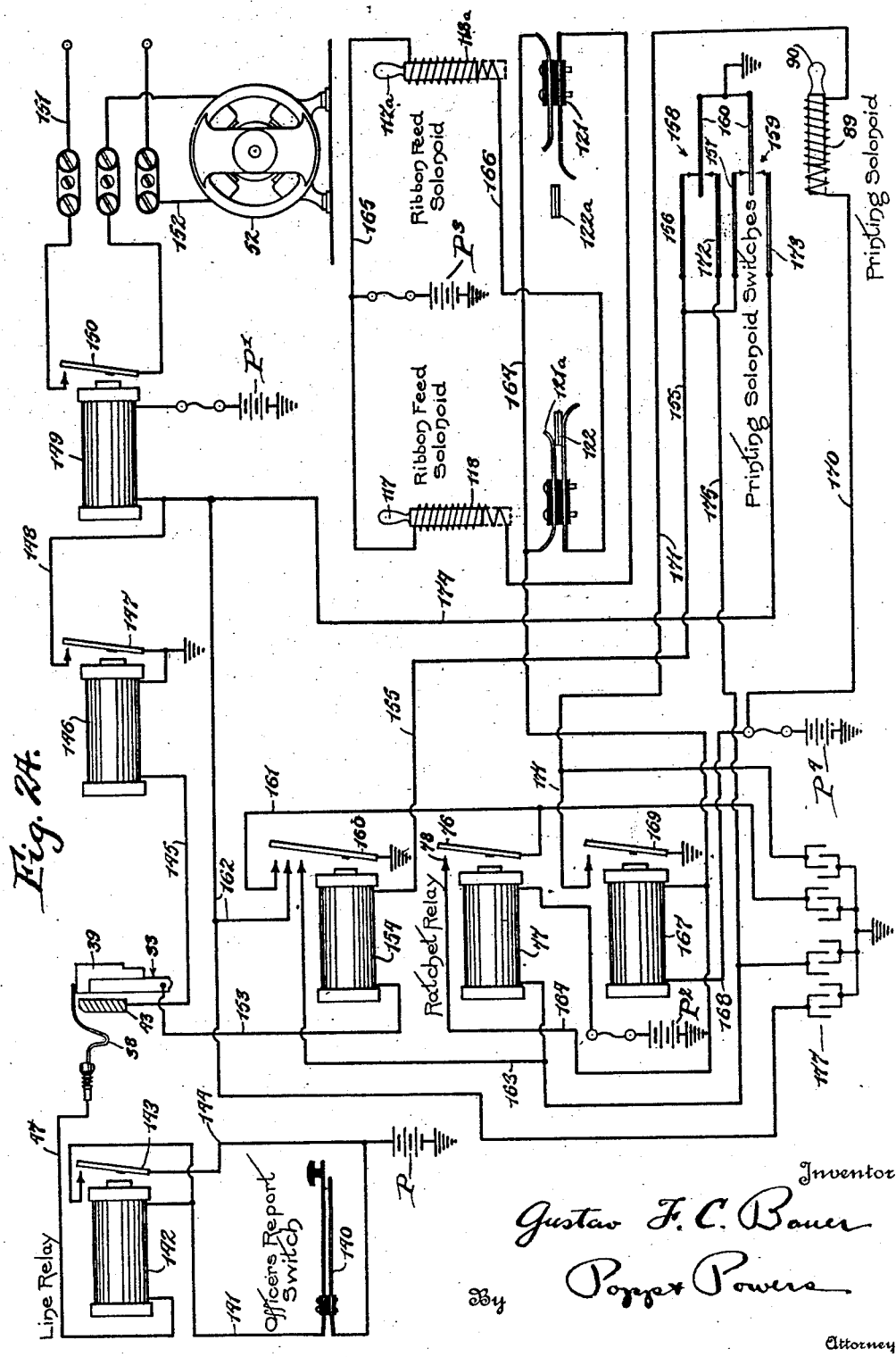

Patented Feb. 17, 1931

1,793,042

BEST AVAILABLE COPY

UNITED STATES PATENT OFFICE

GUSTAV F. C. BAUER, OF TONAWANDA, NEW YORK, ASSIGNOR TO NATIONAL POLICE SIGNAL COMPANY, OF BUFFALO, NEW YORK, A CORPORATION OF NEW YORK

RECORDING APPARATUS

Application filed June 22, 1928, Serial No. 287,617. Renewed December 10, 1930.

This invention relates to a recording apparatus and more particularly to a police time and recorder system by which a permanent record is made at a central station of the time when policemen report at different stations of their posts and thereby enable the chief officers to determine whether or not the policemen are attending to their duties. Although this recording apparatus is more particularly designed for use in police service it is equally useful for keeping a record of other events which require periodical attention and records of reports from remote stations, such, for instance, as recording the time when one or more watchmen call at different parts of a plant, or for recording the time when workmen arrive for work or leave the same. The apparatus can also be used for recording the time record of the operations of different machines or the same machine, where it is desirable to have a record of such operations.

One of the principal objects of this invention is to provide an electrically operated recording machine of this character which is comparatively simple in construction and not liable to get out of order under constant use and in which the same operates to give an accurate and reliable record of the different stations reporting.

A further aim is to provide such a machine in which the machine cannot be manipulated or tampered with so as to give an incorrect record and in which the record itself is made in such manner as to prevent alteration thereof without detection.

A further object is to provide a recorder which is entirely automatic and makes a correct record of the time and each station reporting regardless of the number of stations reporting at the same time.

Another purpose is to provide such a recorder which quickly records the various stations thereby insuring that stations or boxes reporting at the same time will be recorded substantially simultaneously.

Another aim is to provide a recorder which is compact and is readily accessible for repairs or adjustments.

A still further purpose is to provide a record in which all the mechanical and electrical "dead centers" are removed, i. e., a recorder in which under no conditions of its operation will it fail to operate and record each station reporting, regardless of the particular position of the parts at the time the report is made.

In the accompanying drawings:

Figure 4 is a fragmentary vertical longitudinal section taken on line 4—4, Fig. 2.

Figure 5 is a fragmentary vertical transverse section taken on line 5—5, Fig. 4, through the driving gearing.

Figure 6 is a fragmentary side elevation of the printing wheel.

Figure 7 is a fragmentary side elevation of the ring common viewed from the outside.

Figure 8 is a fragmentary vertical transverse section taken on line 8—8, Fig. 10, and showing the ring common, selector arm and associated parts.

Figure 9 is a fragmentary vertical section taken on line 9—9, Fig. 10, and showing the ring common viewed from the inner side.

Figure 10 is a fragmentary side elevation of the printing wheel and selector arm and showing the ring common and associated parts in section.

Figure 11 is a fragmentary horizontal section taken on line 11—11, Fig. 10, and showing the brush for the selector arm.

Figures 12-16 are fragmentary vertical transverse sections taken on line 12—12, Fig. 4, and showing the ratchet driving mechanism; Fig. 12 showing the mechanism in its inoperative position; Fig. 13 showing an enlarged view thereof; Fig. 14 showing the position of the parts at the start of the advancing movement of the mechanism; Fig. 15 showing the mechanism advancing the ratchet wheel, and Fig. 16 showing the position of the parts after the ratchet wheel has been advanced a step, the driving pawl being returned to advance the wheel another step.

Figure 17 is a view similar to Figs. 12 and 13 and showing one of the side plates of the driving pawl carrier removed.

Figure 18 is a fragmentary vertical section taken on line 18—18, Fig. 12.

Figure 19 is a fragmentary vertical section taken on line 19—19, Fig. 12.

Figure 2:
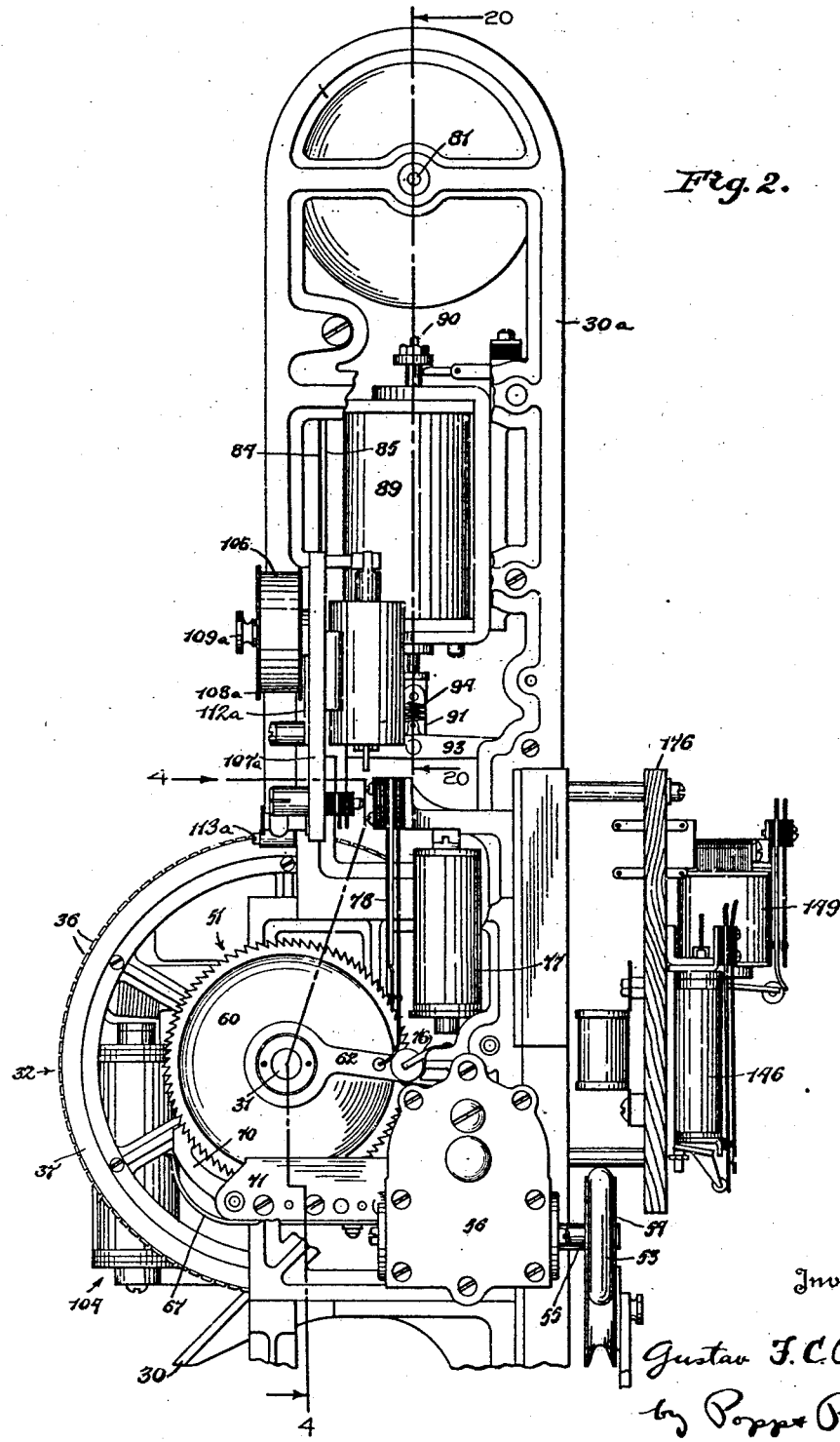
Figure 2 is a fragmentary side view thereof showing portions of the frame broken away to disclose the working parts.

Figure 20 is a fragmentary vertical longitudinal section taken on line 20—20, Fig. 2, and showing the printing mechanism.

Figure 21 is a vertical section taken on line 21—21, Fig. 20.

Figure 22 is a section on line 22—22, Fig. 21.

Figure 23 is a perspective view of the platen and the paper feed pawls associated therewith.

Figure 24 is a schematic view of the circuit for operating the recorder.

Similar reference characters indicate similar parts in each of the several views.

In its general organization this invention comprises a plurality of line circuits which are adapted to be individually energized at remote places by the persons reporting, and a selector arm which is caused to traverse the terminals of the line circuits upon the energization of any of the same, a printing wheel mounted in fixed relation to said selector arm, a time stamp associated with the printing wheel, and means for stopping the printing wheel and selector arm and causing a platen to move into engagement with the corresponding part of the printing wheel and time stamp when a live terminal is struck by the selector arm and thereby cause a record of the time and station reporting to be made on a strip of paper carried by the platen. Means are also provided for continuing the turning of the printing wheel and selector arm as long as any live contacts exist and for stopping the recorder and returning it to its inoperative condition when all the live contacts are traversed by the selector arm and a record made of the police boxes reporting. The invention also embodies a type ribbon feed and a paper feed both of which are operated each time the platen is actuated.

*The selector mechanism*

The numeral 30 represents a metal framework which carries the various parts of the recorder. Suitably journaled in this frame is a shaft 31 which carries a printing wheel 32 and a selector arm 33, as best shown in Figs. 4 and 10. The printing wheel 32 comprises a rim 34 supported by the usual spokes and hub and at its periphery is formed to provide a plurality of spaced slots 35 which receive type slugs 36. Each slug is provided with a projection at opposite ends and these projections are engaged by clamping rings 37, 37 which are secured to the sides of the rim 34 and are provided with internal annular grooves in which the projections on the ends of the slugs are held. By this means the type slugs are securely held in the slots but are easily removed, or changed as conditions require.

Each of the slugs carries a number or other indicia designating a particular police box so that when the proper slug is brought in register with the platen and an impression made, a record is left of the box reporting.

The selector arm 33 is adapted to successively contact with a plurality of contact fingers 38 supported in annular arrangement at one end of the machine, this selector arm forming a part of the circuit for actuating the recorder when a live terminal is engaged thereby. For this purpose the selector arm carries a rounded contact 39 which is insulated from the shaft 31 and frame and is electrically connected with a contact ring 40. This contact ring 40, as best shown in Figs. 8, 10 and 11, is engaged by a brush 41 forming part of the operating circuit.

As best shown in Figs. 7–10, the contact fingers 38 are removably mounted on an annular fiber holder 42 and are arched so as to normally yieldingly bear against the periphery of a ring common or common contact 43. The annular fiber contact holder 42 and the ring common 43 are fixedly mounted on a spider 44 by means of bolts 45, suitable spacers being provided between the ring common and the contact holder. The spider 45 is rigidly mounted on the main frame by means of a bracket 46 and the contact fingers 38 and ring common 43 are thereby held in stationary relation to the contact arm. Each of the contact fingers 38 is connected by a wire 47 with its respective police box, the several wires being bound into a cable 48.

The contact fingers 38 are held in proper spaced relation by a fiber ring 49 which is mounted on one side of the ring common 43 and is provided with a plurality of notches 50 each of which receives a contact finger. By this means, as the selector arm 33 is moved step-by-step around the contact fingers 38, the fingers are successively lifted from the ring common, but by reason of the notches 50 are prevented from moving out of alinement or contacting with an adjacent contact finger.

The number of slugs 36 in the printing wheel 32 exactly corresponds to the number of contact fingers 38, and means are provided, as hereinafter described, for actuating a platen each time a live contact 38 is engaged by the selector arm 33 and move it against the corresponding type slug 36 to make a record of the station calling and the printing face of the type of a time stamp, as hereinafter described.

*The driving mechanism*

The shaft 31 which carries both the printing wheel 32 and the selector arm 33 is turned step-by-step so as to successively bring the type slugs 36 into register with the platen and the selector arm 33 into contact with the corresponding contact fingers 38. For this purpose the shaft 31 is driven by a clutch and ratchet mechanism indicated generally at 51, which clutch and ratchet mechanism is driven by a motor 52. By the term "clutch" as used herein, is meant any means for establishing and breaking the driving connection between a driving and a driven part.

Figure 3:
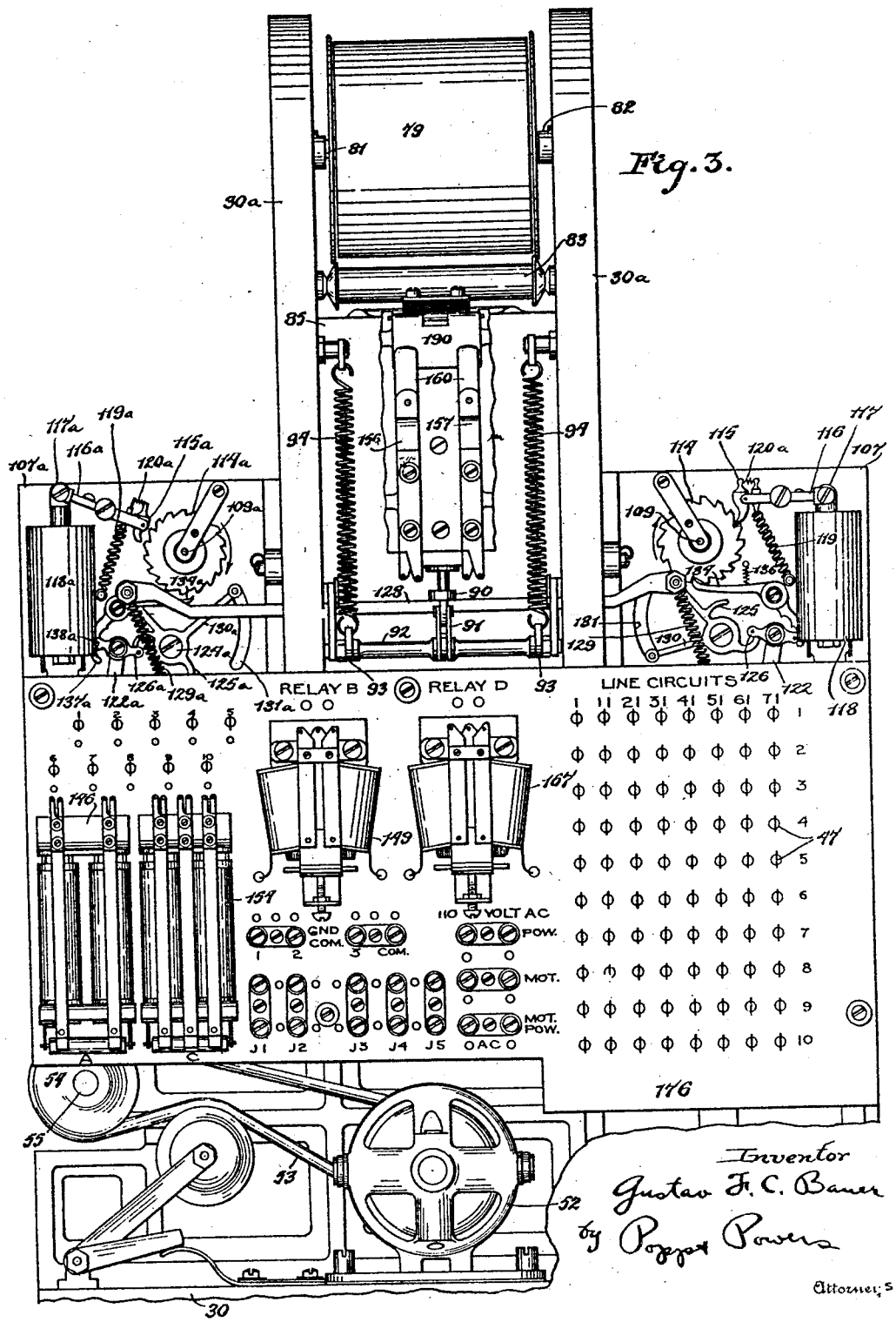
Figure 3 is a fragmentary rear elevation.

As shown in Figs. 3, 4 and 5, the motor is mounted on the frame and is connected by a belt 53 with a pulley 54 mounted on a transverse worm shaft 55. This worm shaft is journaled in a housing 56 and carries a worm 57, this worm engaging and driving a worm wheel 58. The worm wheel 58 is mounted on a longitudinal shaft 59 which is arranged parallel with the driven shaft 31 carrying the printing wheel and selector arm.

As best shown in Figs. 12 and 13, the shaft 31 carries a ratchet wheel 60 which has a series of ratchet teeth 61, which teeth correspond in number to the number of type slugs in the printing wheel 30 in the number of contact fingers 38. Loosely mounted on the hub of this ratchet wheel and on opposite sides thereof are two rocker arms 62, 62 which are riveted at their outer ends to a catch block 63 which also forms a spacer for these rocker arms. Pivotally suspended from these rocker arms is a movable or advancing pawl 64 which has a jaw and a plurality of teeth which engage the teeth of the ratchet wheel 60.

The pawl 64 and the rocker arms which carry it are yieldingly held in a depressed position by a helical spring 65 which is secured at its upper end to one of the rocker arms 62 and at its lower end to a pin which projects laterally from a block 66, which block is arranged under the ratchet wheel 60 and is suitably secured to the machine frame. To insure the engagement of the advancing pawl 64 with the teeth of the ratchet wheel, a flat spring 67 is removably secured to the under side of the block 66 and its rear end is formed to engage and bear against the rear side of the pawl 64 thereby holding it against the teeth of the ratchet wheel 60.

For the purpose of preventing the advancing pawl 64 from overthrowing the ratchet wheel 60 under the influence of the spring 65, the rear end of the block 66 is cut away on its upper side to form a flat seat 64—a, as shown in Fig. 12, against which the lower end of the advancing pawl bears. When the advancing pawl is moved to advance the ratchet wheel, its lower end strikes this seat 64—a and the rotation of the ratchet wheel positively prevented inasmuch as the forward movement of the ratchet wheel, due to the inertia of the parts associated therewith, merely serves to drive the pawl against its seat and into firmer engagement with the ratchet teeth. Since the ratchet wheel, printing wheel and selector arm have considerable inertia, it is essential to provide means to insure the positive advance of the ratchet wheel tooth by tooth regardless of the speed at which the machine is run. It will be noted that the seating of the advancing pawl in no way interferes with its ready retraction when the rocker arms 62 are raised.

The engagement position of the teeth of the ratchet advancing pawl 64 and the teeth 61 of the ratchet wheel 60 is definitely located relative to the advancing pawl seat 64—a on the stop block 66 so that the forces of momentum of the ratchet wheel teeth 61 will meet the teeth of the advancing pawl 64 at approximately right angles to the backs of the ratchet wheel teeth 61 and the backs of the teeth of the advancing pawl 64 and through the driving pawl 64 at approximately right angles to the pawl seat 64—a. When in this position, the backs of the teeth 61 which are in engagement with the teeth of the advancing pawl 64 are at a slight angle to the seat 64—a so that the pawl can be easily withdrawn from engagement with the teeth of the ratchet wheel 60 and the seat 64—a. With this arrangement the forward movement of the ratchet wheel 60 is effected by contact and pressure between the faces of the teeth of the advancing pawl 64 engaging the faces of the teeth on the ratchet wheel 60, and the stopping of the ratchet wheel at the end of the driving stroke is accomplished by the pressure reaction transmitted from the pawl seat 64—a through the backs of the teeth on the advancing pawl 64 and the backs of the ratchet teeth which are in engagement therewith.

To reciprocate the rocker arms 62 and thereby move the advancing pawl 64 up and down to impart a step-by-step motion to the ratchet wheel, a cam 68 is mounted on the drive shaft 59 under the rocker arms 62, 62 and is engaged by a roller 69 arranged at the rear ends of the rocker arms 62, 62. It is apparent that each time the drive shaft 59 turns, the cam 68 reciprocates the rocker arms and consequently the advancing pawl 64 is moved to impart a step-by-step movement to the ratchet wheel 60. The throw of the cam 68 is preferably so proportioned that the advancing dog or pawl 64 is moved to advance the ratchet wheel one tooth at a time, thereby successively bringing each type slug into register with the printing platen and its corresponding contact finger 38 into engagement with the selector arm.

Retrograde movement of the ratchet wheel 60 is prevented by a holding pawl 70 which is pivotally supported on plates 71, these plates being secured to the side of the block 66 and also serving to guide the advancing pawl 64 in its movement. The holding pawl 70 extends upwardly under the ratchet wheel and is held in engagement with the teeth thereof by the front end of the leaf spring 67 which bears against the underside of this pawl.

To render the ratchet mechanism inoperative when a live contact finger has been contacted by the selector arm, the catch block 63 carried between the rocker arms 62 of the ratchet mechanism is formed at its rear end to provide an undercut lip or catch 72 which is adapted to be engaged by the undercut tooth 73 of a latch 74. This latch 74 is mounted on a fixed shaft 75, and is formed to provide a forwardly extending arm 76 which is arranged under a relay 77. The front end of the arm 76 of the latch is normally held in a depressed position by a relay switch 78 and in this position the undercut latch tooth 73 is held out of the path of the undercut catch 72. When, however, the selector arm strikes a live contact finger, the relay 77 is energized, the arm 76 is drawn upwardly and the latch finger 73 moved into the path of the catch 63 so that when the cam raises the rock arms, the undercut catch 63 is caught and the rocker arms 62 held against further movement. In this position, shown in Figs. 12 and 13, the cam 68 rotates idly without effecting movement of the ratchet mechanism.

The undercut tooth 73 of the latch and the undercut catch 72 are so shaped that the engagement of these parts can only be made and broken by the raising action of the salient part of the cam, i. e., the latch will hold the rocker arms 62 whether the relay 77 is deenergized or not until the same is released by the cam 68 moving the undercut catch high enough to release the tooth 73 of the latch. By this means the advancing pawl is only released by the combined action of deenergizing the relay 77 and operation of the motor and accidental dropping of the same and the consequent additional advance movement of the ratchet wheel is thereby prevented. Also the rock arms 62 are limited so as to only follow the complete rotation of the cam 68 and are held against making any partial movements independent of the cam. In the absence of this latch, in certain positions of the cam, the rocker arms 62, if released, would drop against the cam and not drop far enough to permit the pawl 64 to engage its seat 64—a. Under these conditions the ratchet wheel would not be stopped and its momentum might carry the selector arm 33 over a number of contact fingers 38 before the ratchet wheel came to a stop. The catch thereby cooperates in maintaining the recorder in proper synchronism.

*The paper feeding and printing mechanism*

Above the printing wheel the machine frame is extended upwardly to form two skeleton walls 30—a between which the printing and paper feeding mechanism is supported as best shown in Figs. 1-3 and 20-22.

A roll of the paper 79 on which the record is made is supported between the upper ends of the walls 30—a and is preferably supported on a mandrel 80 having pins 81 at its ends which lie in V-shaped sockets 82 so that the mandrel and roll of paper can be readily lifted out of the machine and a new roll of paper substituted.

The paper is fed from the bottom of the roll and as best shown in Figs. 20-22, passes over a guide roller 83 and down between two plates 84 and 85 which are rigidly secured to the frame walls 78. At the lower ends of the guide plates 84 and 85, the paper passes under a roller 86, and thence between the platen 87 and the printing wheel 32. The paper then passes upwardly along the front sides of the frame walls 30—a, the edges of the same being guided by the fingers of a paper advancing device, as hereinafter described. The paper then passes upwardly and over the roll of paper, the same being guided through means carried by the casing or housing (not shown).

Under the roll of paper is arranged a printing solenoid 89 which is mounted on a suitable bracket and has a core 90 which is moved downwardly when the solenoid is energized. To the lower end of this core are pivotally secured a pair of links 91 which connect the core with a cross rod 92. This cross rod is secured at its outer ends to a pair of arms 93 which are pivoted at their rear ends to the frame walls 30—a so that as the core 90 is depressed, the front ends of the arms 93 are also depressed. The front ends of these arms are pivotally secured to the sides of the printing platen 87. To normally hold the platen 87 in its raised inoperative position, a pair of springs 94 support the arms 93 and after deenergization of the printing solenoid 89 return the platen 87 to its uppermost position, the return movement of the platen being preferably adjustably limited.

Figure 1:
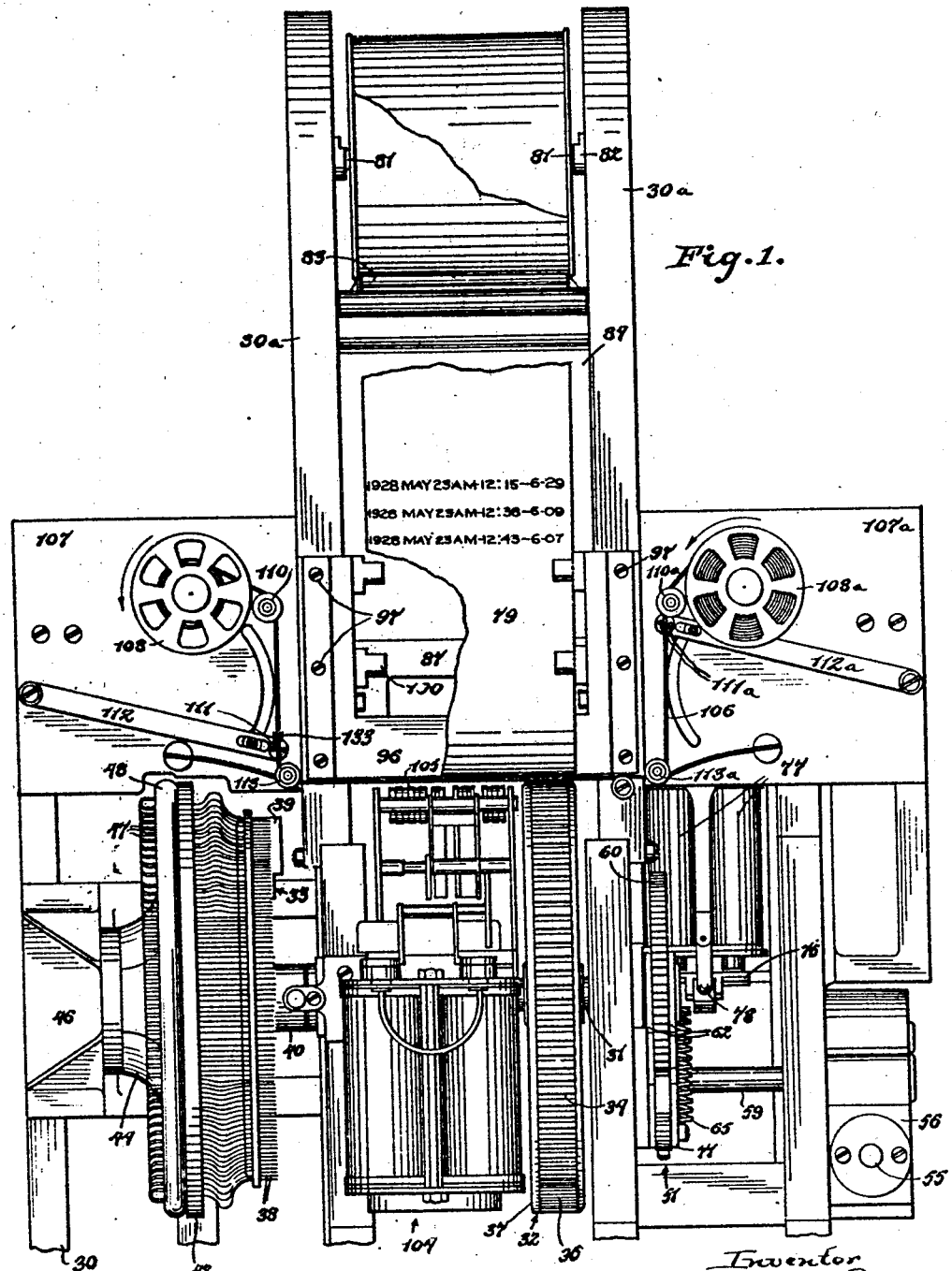
Figure 1 is a fragmentary front elevation of a recording machine made in accordance with my invention.

The printing platen 87 is guided for vertical movement in grooves 95 which are formed in a plate 96, this plate being secured to the frame walls 30—a by screws 97 or in any other suitable manner as best shown in Figs. 1, 21 and 22. At its lower edge this platen 87 has a piece of rubber 98 set therein which is adapted to contact with the paper 79 and move it into contact with the type slug of the printing wheel disposed immediately thereunder, and the printing face of the type of the time stamp.

To feed the paper, a pair of movable feeding dogs 99 are carried by the platen, which dogs engage and move the paper on the up stroke of the platen but ride along the paper on the down stroke. As best shown in Figs. 21 and 23, the platen 87 is formed to provide a pair of forwardly and inwardly projecting fingers 100 and the dogs 99 are pivoted to rearwardly projecting ears provided on the platen and rest against these fingers 100. The paper strip is arranged between the fingers 100 and the dogs 99 and it therefore follows that on the up stroke of the platen the edges of the strip of paper are gripped between each finger and dog and moved upwardly while on the down stroke, the dog and finger ride over the paper, a step-by-step advancing movement being thereby imparted to the paper after an impression has been made.

In order to hold the paper against reverse movement on the down stroke of the platen, a pair of holding or stationary dogs 102 are pivotally mounted on brackets 103, these brackets being secured to the plate 97. These brackets and dogs are similar in arrangement to the fingers 100 and movable dogs 99 and by their stationary mounting permit the free upward movement of the paper strip, but prevent its reverse movement.

The time stamp

A time stamp, indicated at 104 in Fig. 1, is provided which carries movable type 105, the strip of paper 79 being moved into engagement with the printing faces of the type of the time stamp at the same time that a record is made of the police box reporting. By this means a record is made both of the time of the call and the box calling, as shown in Fig. 1. The type of the time stamp may be moved in any suitable manner and may be of any suitable construction, and inasmuch as this time stamp mechanism forms no part of the present invention, a general reference thereto is deemed sufficient, and the same is indicated in Figs. 1 and 2 only. The time stamp is, however, preferably pivoted at its lower end so as to swing outwardly clear of the recording mechanism when it is necessary to reset or to correct the same for time and dates.

The inking ribbon feed mechanism

The ink with which the record is made is supplied by an inked ribbon 106 similar to the ribbon employed in a typewriter, in which the ribbon is passed between the type and the paper, the type impression being made through the ribbon.

In the present machine, the ribbon is wound back and forth on two spools, the ribbon being advanced and reversed with a step-by-step movement by means controlled by electromagnets and as best shown in Figs. 1, 3 and 20 are preferably constructed as follows:

On either side of the skeleton walls 30—a which carry the printing mechanism are arranged two vertical longitudinal plates 107, 107—a, on which the counterpart ribbon feeding mechanisms are mounted. The ribbon spools 108, 108—a are removably secured to two shafts 109, 109—a. The ribbon 106 as shown in Fig. 1, passes from the spools over rollers 110, 110—a, between a pair of forwardly projecting fingers 111, 111—a mounted on ribbon reversing arms 112, 112—a, under guide rollers 113, 113—a and thence under the platen 87 and paper strip 79 and over the uppermost type slugs of the time stamp and the printing wheel.

As shown in Fig. 20, on each of the ribbon spool shafts 109, 109—a is fixed a ratchet wheel 114, 114—a, the teeth of which face in opposite directions. The teeth of these ratchet wheels are engaged by pawls 115, 115—a which are pivotally mounted at the free ends of arms 116, 116—a. These arms 116, 116—a are pivotally supported intermediate of their ends and at their inner ends are pivotally secured to the longitudinally movable cores 117, 117—a of ribbon feed solenoids 118, 118—a. The energization of either of the ribbon feed solenoids 118, 118—a, effects a downward movement of the cores thereof and a downward movement of the inner end of the corresponding arm 111 or 111—a. The return of each of these arms to its normal inoperative position in which its outer end is depressed as shown at the left in Fig. 20 is insured by return springs 119, 119—a which yieldingly hold down the outer ends of these arms.

The outward movement of the teeth of the ribbon advancing pawls 115, 115—a is limited in any suitable manner and the pawls are normally held in this extreme position by small springs 120, 120—a each of which springs is connected to an upward extension on the pawl and a pin on the supporting arm. In operation only one of the ribbon feed solenoids is operative at one time and when the operative solenoid is energized it draws its core down and sweeps the pawl from its inoperative position shown at the left in Fig. 20 to its high point as shown at the right of this figure. Upon deenergizing this solenoid, the return spring sweeps the pawl downwardly, and the pawl engages the teeth of the ratchet ribbon feed wheel, advancing the same and then returning to its normal position shown at the left in Fig. 20.

Through proper circuit arrangement, as hereinafter described, the actual feeding of the ribbon takes place only after a record has been made and the printed portion of the paper has been moved from the printing position. This is done to prevent any interference on the part of the ribbon feed mechanism during the operation of the printing mechanism and to insure a clean record being made.

One ribbon feed solenoid is employed until the end of the ribbon is reached at which time this solenoid is rendered inoperative and the other rendered operative to reverse the ribbon. The means for effecting this automatic reversal of the ribbon are preferably constructed as follows:

As shown at the right in Fig. 20, a ribbon feed knife switch 121—a is mounted which is closed by a blade 122 pivotally mounted on a screw 123. This knife switch 121—a controls the operation of the ribbon feed solenoid 118—a on the opposite side of the machine and when closed places the solenoid in circuit so that each time a printing operation is performed, the solenoid 118—a is momentarily energized to feed the ribbon as described. On the opposite side of the machine is arranged a knife switch 121 and blade 122—a which are mounted in a similar manner and control the solenoid 118.

The means for alternately opening and closing the switches 121, 121—a in response to movement of the ribbon are preferably constructed as follows:

Pivotally mounted on pins 124, 124—a are cow horn rock arms 125, 125—a, the horns of which are adapted to engage opposite sides of rounded projections 126, 126—a, which extend inwardly from the sides of the corresponding knife switch blades 122, 122—a. Formed integrally with the cow horn rock arms are levers 127, 127—a which are connected together by a cross link 128. The cow horn rock arms 125, 125—a are thereby compelled to move together reversely so that when the upper horn of the cow horn rock arm 125—a engages the projection 126—a to move the blade 122—a and close the switch 121 which controls the solenoid 118, the lower horn of the cow horn rock arm 125 engages the under side of the projection 126 so as to move the blade 122 inwardly and open the switch 121—a and thereby render the solenoid 118—a inoperative. This mechanism is yieldingly held in the opposite extremes of its movement by off center springs 129, 129—a which are connected to the outer ends of the levers 127, 127—a and respectively traverse the pins 124, 124—a which support the cow horn rock levers.

The cow horn rock levers 125, 125—a are actuated by arms 130, 130—a which are formed integrally therewith and at their outer ends engage the free ends of the ribbon reversing levers 112, 112—a. For this purpose arcuate slots 131, 131—a are provided in the plates 107, 107—a and pins 132, 132—a provided at the ends of the arms 130, 130—a extend through these slots and have a slot connection with the arms 112, 112—a. Adjacent each end of the inked ribbon a metal grommet 133 is provided, which grommets are adapted to engage the corresponding fingers 111 or 111—a when the ribbon reaches the end of its run in the corresponding direction.

Assuming that the spool 108 is almost completely unwound as shown in Fig. 1, the grommet 133 engages the fingers 111 and moves the arm 112 down as shown in this figure. This movement depresses the arm 130 and moves the cow horn rock lever 125 so that its lower horn lifts the projection 126 and opens the switch 121—a, thereby rendering the solenoid 118—a inoperative, as shown in Fig. 20. At the same time the link 128 is shifted laterally toward the opposite side of the machine and this movement rocks the cow horn rock lever 125—a so as to engage the upper side of the rounded projection 126—a and thereby close the switch 121. The closing of the switch 121 renders the solenoid 118 operative and this solenoid thereby actuates the ratchet wheel 114 and winds the ribbon on the spool 108. When the ribbon is completely wound on this spool 108, the grommet at the other end of the ribbon effects a reverse movement of the mechanism, as described, thereby effecting a reverse movement of the ribbon, the ribbon being continually fed back and forth and thereby securing the maximum amount of service therefrom.

To prevent retrograde movement of the operative ratchet wheel 114 or 114—a, holding pawls 134, 134—a are provided, each of which is rendered inoperative when its ratchet wheel and spool becomes inoperative or unwinds. These holding pawls 134, 134—a are pivotally supported on pins 135, 135—a and the tooth of each pawl is yieldingly held in engagement with the ratchet teeth by a small spring 136. To move this holding pawl away from the ratchet wheel when the wheel is idle, arms 137, 137—a are formed integrally with these pawls and project downwardly therefrom. The inner sides of these arms 137, 137—a are engaged by rounded projections 138, 138—a on the switch blades 122, 122—a so that when one of the switches is closed to render the opposite solenoid operative, the corresponding arm 137 or 137—a is moved outwardly and the corresponding pawl moved away from its ratchet wheel. In Fig. 20 the ratchet wheel 114—a is inoperative, and hence the holding pawl 134—a is held in a position in which it clears the teeth thereof and permits the ribbon to be unwound from the spool, while the opposite holding pawl 134, under the influence of its spring 136 engages the teeth of the operative ratchet wheel 114 and prevents its retrograde movement.

*The circuit*

The operation of the recorder, as shown in Fig. 24, is controlled through a plurality of officers' report switches 140 each of which is located in a patrol box. One terminal of this switch is connected to one terminal of a grounded battery P, while the other switch terminal is connected by a wire 141 with a line relay 142 and also with the fixed contact of an armature 143 which is moved into engagement with its contact by the energization of the relay 142. The armature 143 is connected by a wire 144 with the grounded battery P and the line relay 142 is connected by the wire 47 with its respective contact finger 38.

In its normal position the contact fingers 38 rest on the ring common 43 and are successively lifted therefrom by the selector arm 33. Inasmuch as all of the contact fingers 38 normally rest on the ring common 43, the circuit through the relay 146 is common to all of the line circuits excepting such circuit, the contact finger 38 of which is lifted by the selector arm contact 39. This ring common 43 is connected by a wire 145 with a relay 146, the other terminal of which is grounded. When the relay 146 is energized, the grounded armature 147 is moved into engagement with the fixed contact of a wire 148, which wire connects with one terminal of a relay 149. The other terminal of the relay 149 connects with a grounded battery $P^1$. Only one grounded battery is employed, in actual practice, the same being illustrated and described as separate batteries for ready comprehension of the circuit.

The armature 150 of the relay 149 closes the circuit through the main power lines 151 and 152 and the motor 52.

It is apparent that upon closing the officer's report switch 140 current will pass from the battery P through the officer's report switch 140 and wire 141, relay 142, wire 47, contact finger 38, ring common 43, wire 145, and relay 146 to ground. The energization of the relay 142 closes its armature 143 so that current then passes from the battery through wire 144 and armature 143 to the wire 141 and relay 142 and thence through the same circuit. By this means the relay 142 acts as a holding relay which maintains the circuit after the officer's report switch has been released and until the circuit is broken, which occurs at the conclusion of the cycle of operations of the recorder at another point as hereinafter described.

The operation of the relay 146 closes the circuit through battery $P^1$, relay 149, wire 148, armature 147 and ground and the energization of relay 149 closes the motor circuit. The energization of the motor drives the selector arm 33, the same traversing and lifting each of the contact fingers 38. This rotation of the selector arm continues until a live contact finger is contacted with. As soon as a live contact finger 38 is struck, the selector arm moves it away from the ring common, as shown in Fig. 24, thereby breaking the circuit of the relay 146 and deenergizing the same.

Current from the battery P now passes through the relay 142, contact finger 38, selector arm 33, wire 153, relay 154, wire 155, and through two fixed contacts 156, 157 of two switches 158, 159, and thence through the movable contacts 160 thereof to ground. The switches 158, 159 are actuated by the printing solenoid 89. By reason of the rounded form of the contact 39 on the selector arm 33, the circuit through the line circuit is never broken but is shifted from the relay 146 to the relay 154, without breaking the continuity of the line circuit. Likewise the continuity of the line circuit is not broken during the period in which the selector arm contact 39 passes out from under any line contact finger 38.

The energization of relay 154 causes its grounded armature 160 to contact with wires 161, 162 and 163. The current from battery $P^1$ now passes through relay 149, wire 162, armature 160, to ground, and the motor circuit is thereby maintained and the operation of the motor continued. This secondary control circuit through the relay 149 is essential to the proper operation of the recorder due to the fact that a contact between the selector arm 33 and a line contact finger 38 may be established when the ratchet latch 74 may be in such a position that the armature 76 of the ratchet pick-up relay 77 cannot move to its closed position, such a position of these parts being shown in Fig. 15, unless the motor is energized and rotates the cam 68 to a position where the armature 76 can complete its movement to close the switch 73 associated with this relay 77. In this manner a possible dead center at this point of the cycle of operations is eliminated.

In the rotation of the selector arm contact 39, there will occur periods when there is actual electrical contact between the line circuit contact fingers 38, selector arm contact 39 and the ring common 43. At such moments there will exist a divided circuit through the relays 142 and 146 and also through the relays 142 and 154. To prevent operation of the relay 154 at such periods, relays 146 and 154 are each so wound that the distribution of energy flowing through the relay 142 will largely favor relay 146 and permit this relay to function but prevent relay 154 from functioning. This is done by providing the relay 146 with a relatively low resistance winding relative to the winding on relay 154. Relay 154 can therefore only come into operation when the contact arm 33 is engaged with and has isolated a live contact finger 38.

If the selector arm 33 should be in complete engagement with a contact finger 38 and the contact finger is energized while in this position, no circuit will be established through the relay 146, but the circuit will be established directly through the relay 154 and the remaining cycle of circuit combinations will be carried on in the regular manner as hereinafter described.

The energization of the relay 154 also closes the circuit through the ratchet relay 77, the current passing from battery $P^2$ through the ratchet relay 77, wire 163, and grounded armature 160. This stops the operation of the ratchet mechanism by lifting the movable pawl mechanism out of the influence of the cam 68 and also causes its armature 76 to contact with a wire 164.

The closing of the armature 76 causes one or the other of the ribbon feed solenoids 118 or 118—a to be energized, the solenoid 118—a being shown in Fig. 24 as being operative and the current passing from battery P³, wire 165, ribbon feed solenoid 118—a, wire 166, switch 121—a, wire 164, armature 76, wire 161, to the grounded armature 160 of relay 154. The alternate operation of the ribbon feed switches 121 and 121—a is controlled by the ribbon as previously described.

The energization of the ratchet relay 77 also closes the circuit through relay 167, the current passing from grounded battery P⁴, wire 168, relay 167, wire 164, ratchet relay armature 76, wire 161, and grounded closed armature 160.

The operation of this relay 167 closes its grounded armature 169 and causes the printing solenoid 89 to be energized, the current passing from battery P⁴, wire 170, printing solenoid 89, wire 171, and grounded armature 169.

The operation of the printing solenoid 89 (see Fig. 21) causes its core to lower, thereby lifting a pair of wedge-shaped pieces 190 which control the operation of the printing solenoid switches 158 and 159 and this permits the movable contacts 160 thereof to engage and ground the other fixed contacts 172 and 173 of these switches. These switches are each so constructed and arranged that the armature 90 of the printing solenoid 89 actuates the movable switch contacts 160 only when approaching the end of its downward stroke and reverses the contacts to normal only when approaching the end of its up stroke.

This movement of the switches 158 in response to the downward movement of the printing solenoid breaks the circuit through the relay 154, the same being through battery P, wire 144, armature 143, wire 141, line relay 142, wire 47, finger 38, selector arm 33, wire 153, relay 154, wire 155, fixed contacts 156, 157, movable contact 160, to ground. The deenergization of this relay 154 therefore breaks its circuit through the relays 142, 149, 77, 167, the ribbon feed solenoid 118 or 118—a and the printing solenoid 89. The deenergization of the printing solenoid permits the switches 158 and 159 to return to their original position, shown in Fig. 24 and the recorder is therefore returned to its normal position. Upon the deenergization of relay 142, the line circuit is restored to its normal inoperative condition. If several of the contact fingers 38 should be energized at the same time by several officers simultaneously reporting from different boxes, as soon as one box is recorded, inasmuch as the ring common 43 is continued to be energized by the other live fingers, the energization of the relay 146 would be continued and hence the motor circuit would be maintained until the last live finger was touched by the selector arm and a record made of all boxes reporting.

It will be noted that the motor circuit is maintained until the printing solenoid is deenergized and the printing solenoid switch 159 is returned to its normal position shown in Fig. 24, this circuit being through the battery P¹, relay 149, wire 174, fixed contact 173, and the movable contact 160, to ground. By this means, in the event that the ratchet relay 77 is not properly released, the motor continues to operate the device until the cam 68 releases its armature. In the same manner, the energization of the relay 77 is continued until the printing solenoid is deenergized and all parts returned to their inoperative position, this circuit being maintained by the energization of the printing solenoid 89 through battery P², pick-up relay 77, wire 63, wire 175, fixed contact 172, and movable contact 160 to ground. By this means when successive contact fingers 38 are energized, the ratchet relay is held in proper successive printing operations are insured.

To provide for ready adjustment and repair of the electrical parts, the clips and relays, except the line relays of the electrical circuit, are mounted on a terminal panel 176 on which the various line circuits also terminate.

To reduce sparking at the various contacts with consequent injury to them, suitable grounded condensers 177 are provided, the same being arranged in circuit in any manner well known in the art.

*Operation*

The operation of the recorder may be summarized as follows:

Assuming the recorder to be in its inoperative position and that one box is reporting, the officer at reporting box closes the switch 140 thereby energizing the holding relay 142 and also energizing the contact finger 38 with which his reporting switch is associated. This contact finger rests on the ring common 43 and consequently the relays 146 and 149 are energized and a circuit established through the motor 52.

The motor, as shown in Fig. 5, through the belt 53, turns the worm 55 thereby driving the worm wheel 58 and the shaft 59 on which this worm wheel is mounted. The rotation of the shaft 59 rotates the cam 68, and, as shown in Figs. 12–19, this cam in cooperation with the return spring 65, raises and lowers the rock arms 62 which are mounted on the main shaft 31 and carry the advancing pawl 64. The pawl is thereby reciprocated along the teeth of the ratchet wheel 60 one tooth at a time, and the main or driven shaft 31 is rotated step-by-step.

The printing wheel 32 and the selector arm 33 are secured to this shaft 31 and as shown in Fig. 4 and at each advance, successive type slugs 36 are brought into register with the printing platen 94 and at the same time the selector arm 33 contacts successively with the corresponding contact fingers 38.

This step-by-step movement is continued until the selector arm 33 strikes the live contact finger 38 of the box reporting and in which position the corresponding type slug 36 is disposed under the platen 87. The selector arm on striking the live contact finger 38 moves it away from the ring common thereby deenergizing the relay 146 controlling the motor circuit.

At the same time, the current from the live contact finger 38 passes through the selector arm 33 and energizes the relay 154 (Fig. 24) which continues the energization of the motor relay 149, thereby continuing the operation of the motor. At the same time the energization of the relay 154 simultaneously energizes the ratchet pick-up relay 77, which latter also energizes the operative ribbon feed solenoid. The energization of the relay 154 also energizes the relay 167 which in turn energizes the printing solenoid 89.

Upon energizing the ratchet pick-up solenoid, as shown in Figs. 12 and 13, picks up the rear arm 76 of the latch 74 and consequently when the rock arms 62 of the ratchet drive are raised by the cam 68, the catch 63 carried thereby is caught by the latch finger 73 and as long as the ratchet pick-up solenoid remains energized, the cam 68 travels around idly and the motor 52 therefore is entirely disconnected from the main shaft 31 and rendered idle.

The energization of the ribbon feed solenoid, as shown in Fig. 20, causes it to rock the arm 116 and sweep its pawl 115 across the teeth of the ratchet wheel 114. This movement of the ratchet pawl 115 causes the spool on the front side of the panel 107 to be turned, thereby advancing the ribbon one step. Two ribbon feed mechanisms are provided for alternately driving the ribbon in opposite directions, the reversal being effected through a mechanism controlled by tappets or grommets provided in the ribbon as previously described.

As shown in Fig. 21, the energization of the printing solenoid 89 causes its core to move downwardly and force the rubber face of the platen 87 against the selected type slug of the printing wheel and also against the movable type of the time stamp 104. An impression of the box reporting is thereby made on the paper strip 79 and upon deenergization of the printing solenoid 89, the platen is moved up by its return spring, and the dog 99 carried thereby engages and advances the paper strip 79 preparatory to the next operation of the machine.

As shown in Figs. 3 and 21, the downward movement of the printing solenoid core 90 also forces the wedge 190 down against the movable contacts 160 of the switches 158, 159, thereby breaking the circuit through relay 154 (Fig. 24) and thereby deenergizing the printing solenoid 89, the line relay 142, the relay 167 and the ribbon feed solenoid. The circuits of the ratchet pick-up relay 77 and the motor relay 149 as controlled by the relay 154 are also broken by its deenergization but these two circuits are taken up by the printing solenoid switches 158, 159 and are maintained until the printing solenoid 89 is deenergized and the switches 158 and 159 returned to their normal position.

Upon return of the printing solenoid switches 158, 159 to their normal inoperative position all of the relays and solenoids are deenergized and the recorder is in inoperative position ready to record the next report. If two reports are made at substantially the same time, the relay 146 is kept energized by the other live contact finger 38 engaging the ring common, and as soon as a record is made through the first live finger touched, as just described, the recorder immediately goes through the same cycle of operation for the next live contact finger and so on until the recorder is cleared and no live contact finger exists.

It will be observed that should a report be made on a contact finger which is engaged by the selector arm 33 and the cam 68 is in a position in which its high face has just passed beyond the roller 68, in which position the armature 76 thereof could not catch and hold the rock levers 62 and disconnect the motor, the machine will not operate, but the motor drive will be continued until the selector arm traverses all of the contact fingers and returns to this finger, the energization of which has been maintained. This possible "dead center" is eliminated since under these circumstances the armature 78 would not close the circuit through the relay 167 and the printing solenoid 89 and as the line circuit is only broken after an operation of the printing solenoid, the energized line circuit is not broken until it is again traversed by the selector arm and a proper record made.

The recorder embodying the present invention is comparatively simple considering the function which it performs, it is reliable in operation, the record cannot be tampered with, and it will perform continuously and accurately to keep a permanent record of all reports without getting out of order. It is also adapted to be used in connection with any number of line circuits and gives a clear and legible record.

I claim as my invention:

1. A recording apparatus including a plurality of line circuit terminals, selector means traversing said terminals, recording means having a movable member carrying a series of indicia, means for driving said movable member and selector means in fixed relation to one another, and means for discontinuing said driving means and actuating said recording means when a live terminal is engaged by said selector means.

2. A recording apparatus including a plurality of line circuit terminals, selector means traversing said terminals, recording means having a movable member carrying a series of indicia, means for driving said movable member and selector means in fixed relation to one another upon the energization of any of said terminals, and means for discontinuing said driving means and actuating said recording means when an energized terminal is engaged by said selector means.

3. A recording apparatus including a plurality of line circuit terminals, selector means traversing said terminals, recording means having a movable member carrying a series of indicia, a motor driving said movable member and said selector means in fixed relation to one another, clutch means between said motor and driven members and normally closed, means for energizing said motor upon the energization of any one of said terminals, means for opening said clutch and actuating said recording means when an energized terminal is engaged by said selector means, and means for deenergizing said motor and closing said clutch when all energized line terminals have been recorded.

4. A recording apparatus including a plurality of line circuit terminals, selector means traversing said terminals, a printing wheel having a series of printing indicia, means for driving said selector means and printing wheel in fixed relation to one another, a platen mounted adjacent to said printing wheel and movable into engagement with one of the indicia thereof, means for actuating said driving means when any of said terminals are energized, and means for discontinuing said driving means and actuating said platen when a live terminal is engaged by said selector means.

5. A recording apparatus including a plurality of line circuit terminals, selector means traversing said terminals, a printing wheel having a series of printing indicia, means for driving said selector means and printing wheel in fixed relation to one another, a platen mounted adjacent to said printing wheel and movable into engagement with one of the indicia thereof, means for actuating said driving means when any of said terminals are energized, means for discontinuing said driving means and actuating said platen when a live terminal is engaged by said selector means, and means responsive to the movement of said platen for restoring the parts to normal inoperative position.

6. A recording apparatus including a plurality of line circuit terminals, selector means traversing said terminals, a printing wheel having a series of indicia, a motor for driving said printing wheel and selector means in fixed relation to one another, normally closed clutch means between said motor and said printing wheel and selector means, electro-magnetic means for opening said clutch means, a platen movable toward said wheel, electro-magnetic means actuating said platen, means for energizing said electro-magnetic means when said selector means strikes a live terminal, and means actuated through motion deriving from said platen actuating means for deenergizing said motor, said electro-magnetic means and terminal when the record is made.

7. A recording apparatus including a plurality of line circuit terminals, selector means traversing said terminals, a printing wheel having a series of indicia, a motor for driving said printing wheel and selector means in fixed relation to one another, normally closed clutch means between said motor and said printing wheel and selector means, electro-magnetic means for opening said clutch means, a platen movable toward said wheel, electro-magnetic means actuating said platen, means for energizing said electro-magnetic means when said selector means strikes a live terminal, means actuated through motion deriving from said platen actuating means for deenergizing said motor, said electro-magnetic means and terminal when the record is made, and means for maintaining the energization of said motor if more than one terminal are contemporaneously energized.

8. A recording apparatus including a plurality of line circuit terminals arranged in an annular row, a driven shaft, a selector arm carried by said shaft and engageable with each of said terminals, a printing wheel fixed to said shaft, a platen mounted for movement toward and from said printing wheel, means for driving said shaft, and means for discontinuing driving of said shaft and moving said platen toward said printing wheel when an energized terminal is engaged by said selector arm.

9. A recording apparatus including a fixed plate of insulating material, a plurality of spring contact fingers arranged in an annular row and projecting outwardly from said plate, each of said contact fingers forming the terminal of a line circuit, a driven shaft, a selector arm fixed to said shaft, a contact on said selector arm and engageable with each of said contact fingers, a printing wheel fixed to said shaft in proper relation to said selector arm, a platen mounted for movement toward and from said printing wheel, means for driving said shaft in response to the energization of any of said contact fingers, and means actuated in response to the energization of said selector arm contact for discontinuing the driving of said shaft and actuating said platen.

10. A recording apparatus including a fixed plate of insulating material, a plurality of contact fingers arranged in an annular row and projecting outwardly from said plate, each of said contact fingers forming the terminal of a line circuit, a ring common normally engaged by said contact fingers, a driven shaft, a selector arm fixed to said driven shaft, a contact on said selector arm and engageable with each of said contact fingers, said contact being adapted to move said contact fingers successively out of engagement with said ring common, a printing wheel fixed to said shaft in predetermined relation to said selector arm, a motor for driving said shaft, normally closed clutch means between said motor and shaft, electro-magnetic means adapted, when energized, to open said clutch means, a platen movable toward and from said printing wheel, electro-magnetic means adapted, when energized, to move said platen toward said printing wheel, means for energizing said motor in response to the energization of said ring common, and means for energizing said electro-magnetic means in response to the energization of said selector arm contact by a live contact finger.

11. A recording apparatus including a fixed plate of insulating material, a plurality of contact fingers arranged in an annular row and projecting outwardly from said plate, each of said contact fingers forming the terminal of a line circuit, a ring common normally engaged by said contact fingers, a driven shaft, a selector arm fixed to said driven shaft, a contact on said selector arm and engageable with each of said contact fingers, said contact being adapted to move said contact fingers successively out of engagement with said ring common, a printing wheel fixed to said shaft in predetermined relation to said selector arm, a motor for driving said shaft, normally closed clutch means between said motor and shaft, electro-magnetic means adapted, when energized, to open said clutch means, a platen movable toward and from said printing wheel, electro-magnetic means adapted, when energized, to move said platen toward said printing wheel, means for energizing said motor in response to the energization of said ring common, means for energizing said electro-magnetic means in response to the energization of said selector arm contact by a live contact finger, and switch means actuated through motion derived from said platen for deenergizing said motor, electro-magnetic means and live contact finger upon completion of the printing operation.

12. A recording apparatus including a fixed plate of insulating material, a plurality of contact fingers arranged in an annular row and projecting outwardly from said plate, each of said contact fingers forming the terminal of a line circuit, a ring common normally engaged by said contact fingers, a driven shaft, a selector arm fixed to said driven shaft, a contact on said selector arm and engageable with each of said contact fingers, said contact being adapted to move said contact fingers out of engagement with said ring common, a printing wheel fixed to said shaft in predetermined relation to said selector arm and carrying a series of type, a motor for driving said shaft, ratchet means interposed between said motor and shaft and moving said selector arm into engagement with successive contact fingers, electro-magnetic means adapted to render said ratchet means inoperative, a platen movable toward said printing wheel, electro-magnetic means for actuating said platen, means for energizing said motor in response to the energization of said ring common, means for energizing said electro-magnetic means when said selector arm contact strikes a live contact finger, and switch means actuated through motion derived from said platen for deenergizing said motor, electro-magnetic means and live contact finger upon completion of the printing operation.

13. A recording apparatus including a plurality of line contact terminals, means for selectively energizing individual terminals, a common contact engaged by each of said terminals, selector means traversing said terminals and moving said terminals out of engagement with said common contact, a printing wheel, a platen movable toward said printing wheel, a printing solenoid (89) actuating said platen, a motor for turning said printing wheel in fixed relation to said selector means, a motor relay (149) controlling the energization of the motor, normally closed clutch means between said motor and said printing wheel and selector means, a relay (77) for opening said clutch, and a controlling relay (154), said elements being operatively connected and so organized that upon energization of said common contact said motor relay (149) and motor are energized and upon engagement of said selector means with a live terminal, said controlling relay (154) is energized and upon energization of said controlling relay (154) the energization of said motor relay (149) is continued, and said clutch relay (77) and said printing solenoid (89) are energized to effect an opening of said clutch means and a printing movement of said platen.

14. A recording apparatus including a plurality of line contact terminals, means for selectively energizing individual terminals, a common contact engaged by each of said terminals, selector means traversing said terminals and moving said terminals out of engagement with said common contact, a printing wheel, a platen movable toward said printing wheel, a printing solenoid (89) actuating said platen, a motor for turning said printing wheel in fixed relation to said selector means, a motor relay (149) controlling the energization of the motor, normally closed clutch means between said motor and said printing wheel and selector means, a relay (77) for opening said clutch, a controlling relay (154), and a switch (158) actuated by said platen, said elements being operatively connected and so organized that upon energization of said common contact, said motor relay (149) and motor are energized, and upon engagement of said selector means with a live terminal, said controlling relay (154) is energized and upon energization of said controlling relay (154) the energization of said motor relay (149) is continued, and said printing solenoid (89) and clutch relay (77) are energized to effect an opening of said clutch means and a printing movement of said platen, and said platen actuated switch (158) being operable by the movement of said platen to break the circuit through said controlling relay (154) and effect a deenergization thereof.

15. A recording apparatus including a plurality of line circuits, a holding relay (142) in each of said line circuits, means for selectively energizing each of said line circuits, a common contact engaged by the terminals of each of said line circuits, a selector contact traversing said terminals and moving said terminals out of engagement with said common contact, a printing wheel, a platen movable toward said printing wheel, a printing solenoid (89) actuating said platen, a motor for turning said selector contact and printing wheel in fixed relation to one another, a motor relay (149) controlling said motor, normally closed clutch means between said motor and said printing wheel and selector contact, a clutch relay (77) for opening said clutch means, a controlling relay (154) and a relay (167) controlled by said clutch relay and controlling said printing solenoid (89), said elements being operatively connected and so organized that upon energization of said common contact, said motor relay (149) and motor are energized and upon engagement of said selector means with a live terminal, said controlling relay (154) is energized and upon energization of said controlling relay (154) the energization of said motor relay (149) is continued and said clutch relay (77) is energized and upon energization of said clutch relay (77) said printing solenoid relay (167) is energized to energize said printing relay and effect a printing movement of said platen.

16. A recording apparatus including a plurality of line circuits, a holding relay (142) in each of said line circuits, means for selectively energizing individual circuits, a common contact engaged by the terminals of each of said circuits, selector means traversing said terminals and moving said terminals out of engagement with said common contact, a printing wheel, a platen movable toward said printing wheel, a printing solenoid (89) actuating said platen, a motor for turning said printing wheel in fixed relation to said selector means, a motor relay (149) controlling the energization of said motor, a motor relay (146) energized in response to the energization of said common contact and controlling the energization of said motor relay (149), normally closed clutch means between said motor and said printing wheel and selector contact, a clutch relay (77) for opening said clutch means, and a controlling relay (154), said elements being operatively connected and so organized that upon energization of said common contact said motor relays (146 and 149) are energized to energize said motor and upon engagement of said selector means with a live terminal, said controlling relay (154) is energized and upon energization of said controlling relay (154) said motor relay (149) is energized thereby and the energization of said motor continued, and said clutch relay (77) and said printing solenoid (89) are energized to effect an opening of said clutch means and a printing movement of said platen.

17. A recording apparatus including a plurality of line circuits, a holding relay (142) in each of said line circuits, means for selectively energizing individual circuits, a common contact engaged by the terminals of each of said circuits, selector means traversing said terminals and moving said terminals out of engagement with said common contact, a printing wheel, a platen movable toward said printing wheel, a printing solenoid (89) actuating said platen, a motor for turning said printing wheel in fixed relation to said selector means, a motor relay (149) controlling the energization of said motor, a motor relay (146) energized in response to the energization of said common contact and controlling the energization of said motor relay (149), normally closed clutch means between said motor and said printing wheel and selector contact, a clutch relay (77) for opening said clutch means, and a controlling relay (154), said elements being operatively connected and so organized that upon energization of said common contact said motor relays (146 and 149) are energized to energize said motor and upon engagement of said selector means with a live terminal, said controlling relay (154) is energized and upon energization of said controlling relay (154) said motor relay (149) is energized thereby and the energization of said motor continued, and said clutch relay (77) and said printing solenoid (89) are energized to effect an opening of said clutch means and a printing movement of said platen, said motor relay (146) being of relatively low resistance and said controlling relay (154) being of relatively high resistance.

18. A recording apparatus including a plurality of line circuits, means for individually energizing said circuits, a holding relay (142) in each of said circuits, a common contact engaged by the terminals of each of said circuits, selector means traversing said terminals and moving said terminals out of engagement with said common contact, a printing wheel, a platen movable toward said printing wheel, a printing solenoid (89) actuating said platen, a motor for turning said selector means and printing wheel in fixed relation to one another, a motor relay (149) controlling said motor, a second motor relay (146) controlling said first motor relay (149), normally closed clutch means between said motor and said printing wheel and selector means, a clutch relay (77) for opening said clutch means, a controlling relay (154) for energizing said printing solenoid (89), a switch (158) actuated by said printing solenoid (89) and a second switch (159) actuated by said printing solenoid, said elements being operatively connected and so organized that upon energizing said common contact, said motor relays (146, 149) are actuated to energize said motor, and upon said selector means engaging a live terminal, a circuit is established through said line circuit, controlling relay (154) and one of said switches (158, 159) and upon energizing said controlling relay (154), the energization of said first motor relay (149) is continued and said clutch relay (77) and printing relay (167) are energized to open said clutch means and energize said printing solenoid (89), the printing movement of said printing solenoid (89) actuating said switches (158, 159) to break the circuit through said controlling relay (154) and to continue the energization of said first motor relay (149) and said clutch relay (154) until said printing solenoid (89) is restored to its normal position.

19. A recording apparatus including a plurality of line circuits, means for individually energizing said line circuits, selector means traversing the terminals of said line circuits, a printing wheel rotatable with said selector means, and a platen movable toward said printing wheel, a solenoid for moving said platen toward said printing wheel, a motor for driving said printing wheel and selector means, and a switch actuated by said platen, said elements being operatively connected and so organized that upon engagement of said selector means with a live terminal, said printing solenoid is energized and upon a printing movement of said platen, said line circuit and printing solenoid are deenergized.

20. A recording apparatus including a plurality of line circuit terminals, selector means traversing said terminals, a motor driving said selector means, means for energizing said motor when any of said line terminals are energized, means for deenergizing said motor when all of said line circuit terminals are contacted by said selector means, recording means, and means for actuating said recording means when a live line circuit terminal is engaged by said selector means.

In testimony whereof I hereby affix my signature.

GUSTAV F. C. BAUER.